United States Patent [19]
De Haan et al.

[11] Patent Number: 5,532,750
[45] Date of Patent: Jul. 2, 1996

[54] INTERLACED-TO-SEQUENTIAL SCAN CONVERSION

[75] Inventors: Gerard De Haan; Paul W. A. C. Biezen; Olukayode A. Ojo, all of Eindhoven, Netherlands

[73] Assignee: U.S. Philips Corporation, New York, N.Y.

[21] Appl. No.: 417,718

[22] Filed: Apr. 3, 1995

[30] Foreign Application Priority Data

Apr. 5, 1994 [EP] European Pat. Off. ............ 94200920

[51] Int. Cl.$^6$ ........................................... H04N 7/01
[52] U.S. Cl. ............................................. 348/452
[58] Field of Search ................................ 348/452, 448, 348/458, 699; H04N 7/01, 7/015

[56] References Cited

U.S. PATENT DOCUMENTS

| | | | |
|---|---|---|---|
| 5,001,563 | 3/1991 | Doyle et al. | 358/140 |
| 5,005,078 | 4/1991 | Gillard | 348/452 |
| 5,208,667 | 5/1993 | Saunders | 348/452 |
| 5,280,350 | 1/1994 | De Haan et al. | 358/140 |

FOREIGN PATENT DOCUMENTS

| | | |
|---|---|---|
| 0391094 | 10/1990 | European Pat. Off. . |
| 0475449 | 3/1992 | European Pat. Off. ......... C22B 1/20 |
| 0482894 | 4/1992 | European Pat. Off. . |
| 0574058 | 12/1993 | European Pat. Off. ......... H04N 5/44 |
| 0622953 | 11/1994 | European Pat. Off. . |

OTHER PUBLICATIONS

PHN 14,079 corresponding to EPA 0,574,068, Ser. No. 08/073,403.
"Time–Recursive Deinterlacing for IDTV and Pyramic Coding" by Feng–Ming Wang and Dimitris Anastassiou, Signal Processing: Image Communication 2(1990) pp. 365–374.

*Primary Examiner*—Victor R. Kostak
*Attorney, Agent, or Firm*—Edward W. Goodman

[57] ABSTRACT

In a method of converting an interlaced video signal (IS) into an output sequentially scanned video signal (SSS), a first sequentially scanned video signal (SS1) is furnished in dependence upon the interlaced video signal (IS). Subsequently, a motion-compensated sequentially scanned signal (MCS) is furnished in dependence upon the first sequentially scanned video signal (SS1). All video lines of the output sequentially scanned video signal (SSS) are furnished in dependence upon both the first sequentially scanned video signal (SS1) and the motion-compensated sequentially scanned signal (MCS) to prevent inaccuracies in motion vectors used in the motion-compensated processing operation (5–9) from resulting in visible distortions.

8 Claims, 1 Drawing Sheet

INTERLACED-TO-SEQUENTIAL SCAN CONVERSION

BACKGROUND OF THE INVENTION

1. Field of the Invention

The invention relates to a method of and apparatus for interlaced-to-sequential scan conversion of video signals to create a non-interlaced or progressively scanned image from an interlaced image.

2. Description of the Related Art

Such a method is described in the article "Time-recursive deinterlacing for IDTV and pyramid coding", by F.-M. Wang and D. Anastassiou, Signal Processing: Image Communication 2 (1990) pp. 365–374. A previously obtained sequentially scanned image is used in a recursive manner which involves a motion-compensated interpolation to create a subsequent sequentially scanned image. More specifically, the recursive interpolation process furnishes additional lines which are inserted between the already available lines of a field to obtain the sequentially scanned image. As the spectrum of the interpolated lines will almost always suffer from inaccuracies in the motion vector estimates, the alias resulting from the original interlaced, i.e., subsampled lines, is not fully compensated for by the spectrum of the interpolated lines. The non-compensated part of the alias results in visible distortions.

SUMMARY OF THE INVENTION

It is, inter alia, an object of the invention to provide a method of and apparatus for interlaced-to-sequential scan conversion of video signals in which this disadvantage is mitigated. To this end, a first aspect of the invention provides a conversion method for converting an interlaced video signal into an output sequentially scanned video signal, comprising the steps of furnishing a first sequentially scanned video signal (SS1) in dependence upon said interlaced video signal (IS), furnishing a motion-compensated sequentially scanned signal (MCS) in dependence upon said first sequentially scanned video signal (SS1), and furnishing all video lines of said output sequentially scanned video signal (SSS) in dependence upon both said first sequentially scanned video signal (SS1) and said motion-compensated sequentially scanned signal (MCS). A second aspect of the invention provides a system for converting an interlaced video signal (IS) into an output sequentially scanned video signal (SSS), comprising means coupled to receive said interlaced video signal (IS) for furnishing a first sequentially scanned video signal (SS1), means for furnishing a motion-compensated sequentially scanned signal (MCS) in dependence upon said first sequentially scanned video signal (SS1), and means for furnishing all video lines of said output sequentially scanned video signal (SSS) in dependence upon both said first sequentially scanned video signal (SS1) and said motion-compensated sequentially scanned signal (MCS).

In the conversion of an interlaced video signal into an output sequentially scanned video signal according to the present invention, a first sequentially scanned video signal is furnished in dependence upon the interlaced video signal. Subsequently, a motion-compensated sequentially scanned signal is furnished in dependence upon the first sequentially scanned video signal. According to a special feature of the invention, all video lines of the output sequentially scanned video signal are furnished in dependence upon both the first sequentially scanned video signal and the motion-compensated sequentially scanned signal to prevent inaccuracies in motion vectors used in the motion-compensated processing operation from resulting in visible distortions.

The invention is based on the following recognition. An interlaced video signal is a subsampled signal, in which each field contains only one half of the total number of lines. As is well known, this subsampling causes alias. For still pictures, the alias of the even lines and the alias of the odd lines are in antiphase, so that the alias does not result in visible distortions. However, moving pictures suffer from distortions caused by alias. Prior art progressive scan methods, in which only the additional lines in each field are interpolated while the lines already present are not subjected to any processing, do not succeed in removing the alias-distortions in moving pictures, because the alias of the interpolated lines and the alias of the original lines are not exactly in antiphase due to inaccuracies of motion vectors used in the interpolation process. However, if in accordance with the present invention, all lines of the output field have been subjected to the interpolation processing, the alias of the even lines and the alias of the odd lines are substantially in antiphase, so that a better picture quality is obtained.

It is noted that EP-A-0,475,499 (Attorney docket PHN 13,442) describes a motion-compensated frame rate conversion in which all output fields are obtained by means of a time-shifting operation which requires a smaller interpolation distance (5 ms in 50 to 100 Hz conversion) than the interpolation distance (10 ms in 50 to 100 Hz conversion) which would be required when interpolated fields are inserted between original fields. This interpolation distance reduction results in reduced motion vector artifacts because smaller motion vectors are used. As there is no such interpolation distance reduction and motion vector shortening in the present invention, there is no incentive for those skilled in the art to consider the teachings of EP-A-0,475,499 to solve the problem of the present invention.

These and other aspects of the invention will be apparent from and elucidated with reference to the embodiments described hereinafter.

DESCRIPTION OF THE PREFERRED EMBODIMENTS

Figure 1:
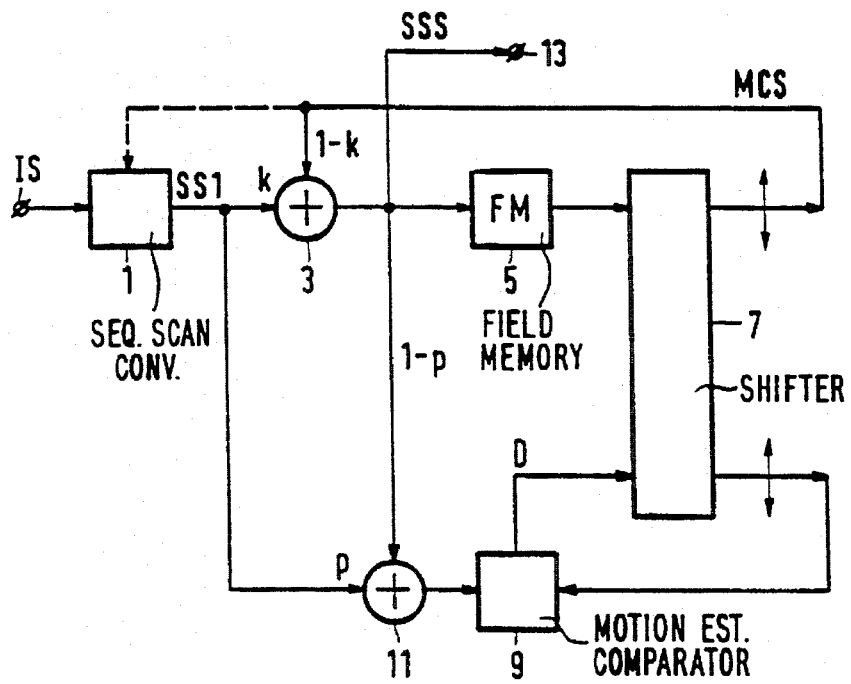
FIG. 1 shows a first embodiment of a conversion apparatus in accordance with the present invention.

In the interlaced-to-sequential converter embodiment of FIG. 1, an interlaced video signal IS is applied to a sequential scan converter 1. The converter 1 may be a very simple intra-field line averager, which creates a pixel value on an additional line by taking the arithmetic mean of positionally corresponding pixel values of two neighboring existing lines. Alternatively, the converter 1 may take the median of positionally corresponding pixel values of the two neighboring existing lines of the same field and the interjacent line of the preceding field. As a further alternative, the interjacent line of the preceding field may be obtained by a motion-compensated interpolation (connection shown in broken lines in FIGS. 1, 2), see U.S. Pat. No. 5,280,350 (Attorney docket PHN 13,443), herein incorporated by reference. The converter may be edge-dependent (contour-dependent) as shown in U.S. Pat. No. 5,001,563 (Attorney docket PHN 12,681).

The first sequentially scanned signal SS1 outputted by the converter 1 is mixed by a mixer 3 with a motion-compensated signal MCS obtained from a motion-compensated interpolation circuit 5, 7, 9 to be described hereinafter. The signals SS1 and MCS are mixed in the ratio k: (1-k). Preferably, k depends on the reliability of the motion vectors used in the motion-compensated interpolation circuit 5, 7, 9. A known method of obtaining motion vectors compares a block of pixels in a present field with a plurality of blocks of pixels in a preceding field. The motion vector obtained thereby is the vector pointing from the block in the present field to the block in the preceding field which has the smallest comparison match error. This smallest comparison match error can be used as a measure of the unreliability of the motion vector. Of course, many other ways of obtaining a suitable mixing factor k are also possible.

The first sequentially scanned signal SS1 and the output signal of the mixer 3 are mixed in the ratio p:(1-p) by a mixer 11. The mixing ratio p is the maximum of the mixing ratio k and a predetermined minimum value, for example, 0.5, to avoid that a too small amount of the output signal of the converter 1 is applied to a first input of a motion-estimation comparator 9 which would result in a "hang-up" of the recursion loop.

The non-interlaced output signal of the mixer 3 is also applied to a full field memory 5 which delays all lines of the sequentially scanned mixer output signal by a field period. The delayed signal from the field memory 5 is applied to a shifter 7 which contains several line- and pixel delays so that all pixels within a given window can be made available at the output terminals shown at the right-hand side of the shifter 7. One of these shifter output terminals supplies the motion-compensated signal MCS to the mixer 3. Another shifter output terminal is applied to a second input of the motion-estimation comparator 9. The comparator 9 compares in known manner the block of pixels applied to its first input with several blocks of pixels from a previous field period as supplied by the shifter 7. The best match results in a motion vector D which is applied to the shifter 7 to select the motion-compensated signal MCS applied to the mixer 3. Of course, any other motion estimation-compensation configuration will also do, but the embodiment shown is very simple because it requires only one full field memory 5 and only one shifter 7 for both motion-estimation and motion-compensated interpolation. Moreover, the field-memory 5 is used for both motion-estimation/compensation and deinterlacing. Reference is made to EP-A-0,574,068 U.S. application Ser. No. 08/231,858, filed Apr. 22, 1994, Attorney docket PHN 14,079), herein incorporated by reference, for the common use of a field memory for both motion vector estimation and motion-compensated interpolation.

A preferred motion-estimator has been described in "Motion Estimation and Compensation, an integrated approach to consumer display field rate conversion.", by G. de Haan, Eindhoven 1992, herein incorporated by reference.

The output signal of the mixer 3 is supplied at a terminal 13 as the output sequentially scanned video signal SSS. Alternatively, the output terminal 13 may be connected to the output of the field memory 5. It is a special feature of the current invention that all lines of the output signal SSS have been subjected to a motion-compensated processing. Consequently, the alias of the odd lines and the alias of the even lines are substantially in antiphase, so that previous visible distortions caused by alias are strongly reduced in the output signal according to the present invention.

Figure 2:
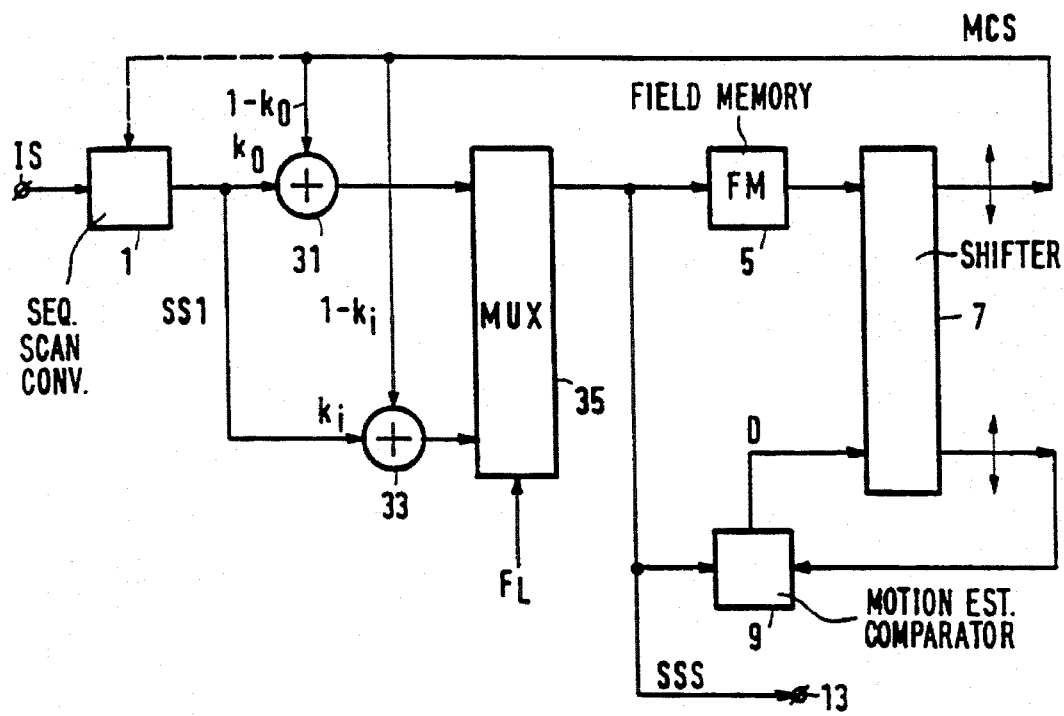
FIG. 2 shows a second embodiment of a conversion apparatus in accordance with the present invention.

FIG. 2 shows a second embodiment of an interlaced-to-sequential scan conversion circuit in accordance with the present invention. The output signal SS1 of the sequential scan converter 1 and the motion-compensated signal MCS are mixed in a first mixer 31 in a mixing ratio ko:(1−ko), and in a second mixer 33 for the interpolated lines in a mixing ratio ki:(1−ki). The first mixer 31 is operative for first lines positionally corresponding to original lines of a present field of the interlaced video input signal. The second mixer 33 is operative for second lines positionally corresponding to interpolated lines between the original lines of the present field of the interlaced video input signal. Output signals of the mixers 31 and 33 are applied to a multiplexer 35 controlled by a line-frequent switching signal FL to supply the appropriate mixer output signal as the output sequentially scanned signal SSS at the output terminal 13. The multiplexer output signal is also applied to the full field memory 5 and to the first input of the motion-estimation comparator 9. For the remainder, the embodiment of FIG. 2 corresponds to that of FIG. 1.

The advantage of having two separate mixers 31, 33 for original and interpolated lines, or of any other implementation of two separate mixing ratios, is that it provides the possibility of protecting first lines positionally corresponding to original lines (controlled by mixing factor ko) to a higher extent from being spoiled by unreliable motion vectors than the second lines positionally corresponding to interpolated lines (controlled by mixing factor ki). This is based on the recognition that original lines constitute the most reliable input information available to the filter. While in accordance with the basic principle of the present invention, the original lines and the inserted lines should undergo the same processing to ensure that the alias of the original lines and the alias of the inserted lines are in antiphase, even with motion vectors which are not completely correct, it appears that better results are obtained with motion vectors which are too unreliable, if a higher amount of fresh information from the original lines is used.

As has been described with regard to the embodiment of FIG. 1, the mixing factors ko, ki preferably depend on the motion vector reliability: the lower the reliability, the higher the mixing ratios in order to introduce more fresh input information which is not spoiled by unreliable motion vectors. Preferably, $ki=(1+\sqrt{d})/16$ and $ko=(6+2\sqrt{d})/16$, with $d=abs(difsum)/6$ with difsum being the sum of the differences between six pixels surrounding the current pixel from the converter 1 and six positionally corresponding pixels from the motion-compensated signal MCS. The six pixels may be three pixels on the line above the current pixels and three pixels on the line below the current pixel having the same horizontal positions as the first-mentioned three pixels.

In a further advantageous modification, at least the mixing factor ki for ki the interpolated lines depends on a vertical motion vector component, whereby a mixing factor ki used with odd vertical motion vector components exceeds a mixing factor 1d used with even vertical motion vector components. This modification is based on the following recognition. With an even vertical motion vector component, for example zero, when the lines are considered in the temporal direction, there is an alternation of original and inserted lines. Consequently, there is enough supply of fresh information and there is no danger that old information just keeps circulating in the recursion loop. However, with an odd vertical motion vector component, interpolated lines are followed by interpolated lines, so that with a small mixing factor, old information may be circulating in the recursion loop. Therefore, the mixing factor ki for odd motion vector components preferably exceeds that for even motion vector components to avoid such a "hang-up" of the recursion loop.

It should be noted that the above-mentioned embodiments illustrate rather than limit the invention, and that those skilled in the art will be able to design many alternative embodiments without departing from the scope of the appended claims. While the preferred embodiments shown in the drawing are recursive, i.e., the output sequentially scanned signal SSS is applied to the motion-compensated processing means 5–11, it will be obvious that the gist of the invention is also realized in a non-recursive embodiment in which the inputs of field memory 5 and comparator 9 are directly connected to the output of the converter 1.

The invention can be used to great advantage in television sets operating with a standard of 525 lines per two interlaced 60 Hz fields, because there a progress scan conversion yields the largest visible improvement. The invention can also be advantageously with non-interlaced matrix type displays.

We claim:

1. A method of converting an interlaced video signal into an output sequentially scanned video signal, comprising the steps of:

furnishing a first sequentially scanned video signal (SS1) in dependence upon said interlaced video signal (IS);

furnishing a motion-compensated sequentially scanned signal (MCS) in dependence upon said first sequentially scanned video signal (SS1); and generating all video lines of said output sequentially scanned video signal (SSS) in dependence upon both said first sequentially scanned video signal (SS1) and said motion-compensated sequentially scanned signal (MCS).

2. An apparatus for converting an interlaced video signal (IS) into an output sequentially scanned video signal (SSS), comprising:

means coupled to receive said interlaced video signal (IS) for furnishing a first sequentially scanned video signal (SS1);

means for furnishing a motion-compensated sequentially scanned signal (MCS) in dependence upon said first sequentially scanned video signal (SS1); and means for generating all video lines of said output sequentially scanned video signal (SSS) in dependence upon both said first sequentially scanned video signal (SS1) and said motion-compensated sequentially scanned signal (MCS).

3. An apparatus as claimed in claim 2, wherein said generating means comprises means for combining said first sequentially scanned video signal (SS1) and said motion-compensated sequentially scanned signal (MCS) to furnish said output sequentially scanned video signal (SSS).

4. An apparatus as claimed in claim 3, wherein said combining means comprise a first mixer for first lines positionally corresponding to original lines of a present field of the interlaced video signal, a second mixer for second lines positionally corresponding to interpolated lines between said original lines, and a multiplexer for line-alternately selecting an output of the first mixer or an output of the second mixer.

5. An apparatus as claimed in claim 4, wherein at least a second mixing factor (ki) of said second mixer depends on a vertical motion vector component, whereby a mixing factor (ki) used with odd vertical motion vector components exceeds a mixing factor (ki) used with even vertical motion vector components.

6. An apparatus as claimed in claim 2, wherein said motion-compensated means are coupled to receive said output sequentially scanned video signal (SSS).

7. An apparatus a claimed in claim 2, wherein said motion-compensated means are motion-vector-compensated means.

8. An apparatus as claimed in claim 2, wherein said motion-compensated means includes means for estimating motion vectors, and wherein said generating means includes means for providing a weighted averaging of first sequentially scanned video signals (SSI) and said motion-compensated sequentially scanned signal (MCS) to generate said output sequentially scanned video signal (SSS), with weights depending on a reliability of said motion vectors.

* * * * *